(12) United States Patent
Messager et al.

(10) Patent No.: US 6,928,074 B1
(45) Date of Patent: Aug. 9, 2005

(54) METHOD OF TRANSMITTING DATA, A BROADCAST MODULE, AND A TERMINAL FOR IMPLEMENTING THE METHOD

(75) Inventors: André Messager, Choisy le Roi (FR); Lahcen Bennai, Argenteuil (FR)

(73) Assignee: Alcatel, Paris (FR)

( * ) Notice: Subject to any disclaimer, the term of this patent is extended or adjusted under 35 U.S.C. 154(b) by 784 days.

(21) Appl. No.: 09/712,919

(22) Filed: Nov. 16, 2000

(30) Foreign Application Priority Data

Nov. 18, 1999 (FR) .................................. 99 14492

(51) Int. Cl.⁷ ............................................. H04L 12/28
(52) U.S. Cl. .................. 370/390; 370/389; 370/395.63
(58) Field of Search ............................... 370/389, 390, 370/395.63

(56) References Cited

U.S. PATENT DOCUMENTS

| | | | |
|---|---|---|---|
| 5,519,704 A | | 5/1996 | Farinacci et al. |
| 5,719,862 A | * | 2/1998 | Lee et al. .................... 370/355 |
| 5,974,048 A | * | 10/1999 | Godse et al. ............... 370/396 |
| 6,314,105 B1 | * | 11/2001 | Luong ...................... 370/395.2 |
| 6,545,982 B1 | * | 4/2003 | Murthy et al. ............... 370/245 |

FOREIGN PATENT DOCUMENTS

| | | | | |
|---|---|---|---|---|
| DE | 000461279 A1 | * | 6/1990 | ........... H04L 12/18 |
| EP | 0 598 969 A1 | | 1/1994 | |
| EP | 0 613 269 A2 | | 8/1994 | |

* cited by examiner

*Primary Examiner*—Wellington Chin
*Assistant Examiner*—Mark A Mais
(74) *Attorney, Agent, or Firm*—Sughrue Mion, PLLC

(57) ABSTRACT

A broadcasting method which can be used in an X.25 network. To transmit a block of information from a terminal to a broadcast module in the switch to which that terminal is connected, it consists of
  sending a call request packet from the terminal to the broadcast module of the switch to request the setting up of an X.25 virtual circuit between said first terminal and the broadcast module of the first switch, placing a broadcast request in one field of said call request packet, and
  placing the block of information to be broadcast in the data packets of the X.25 virtual circuit set up between said terminal and the broadcast module in response to said call request packet.

35 Claims, 2 Drawing Sheets

Figure 1:
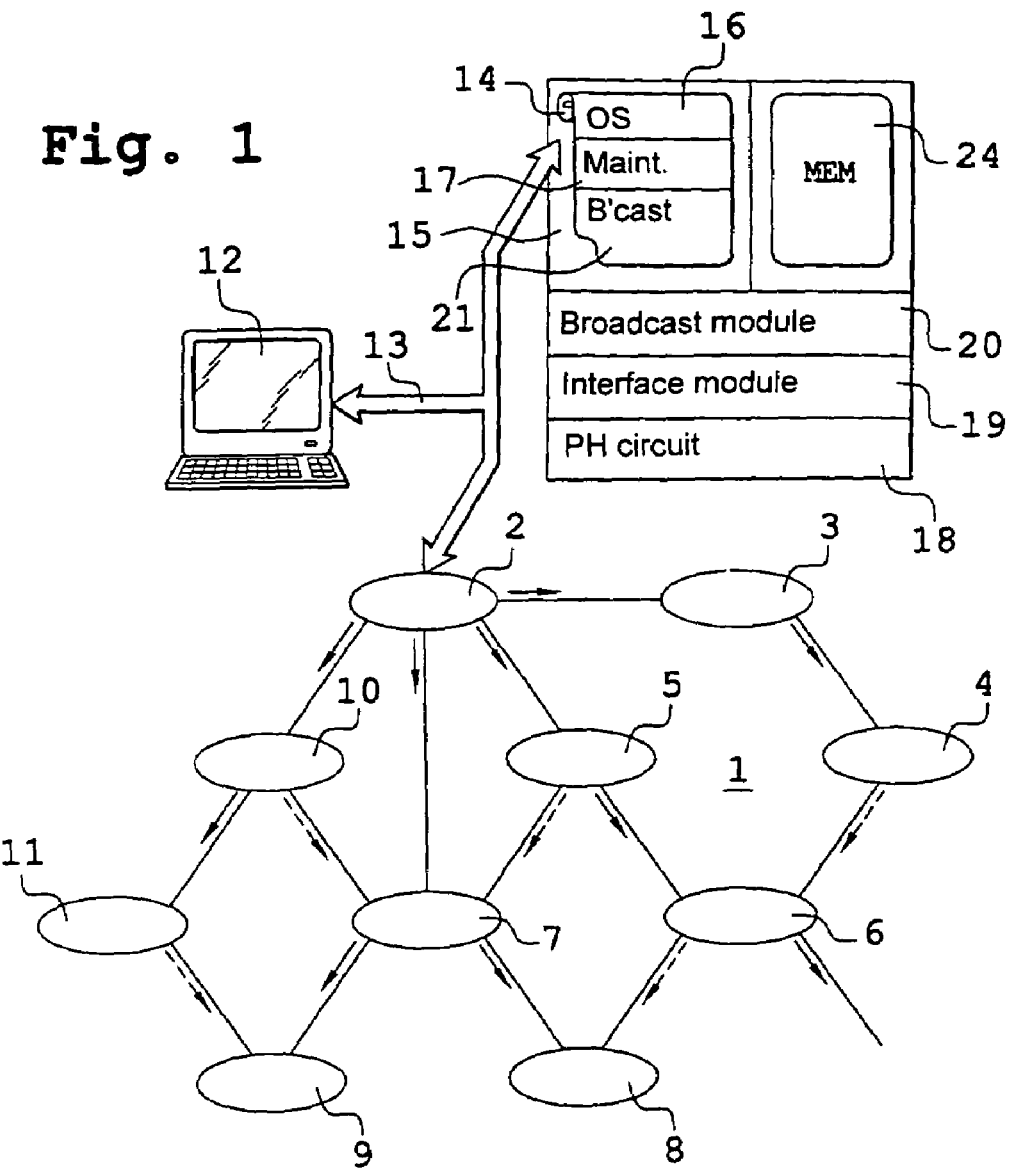

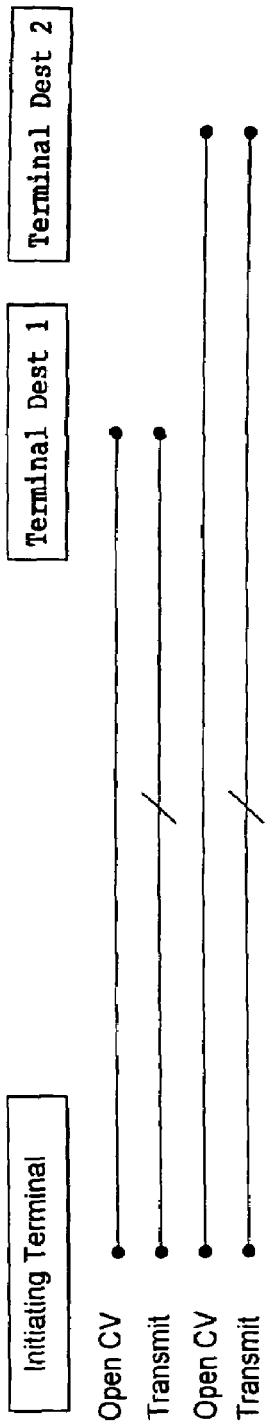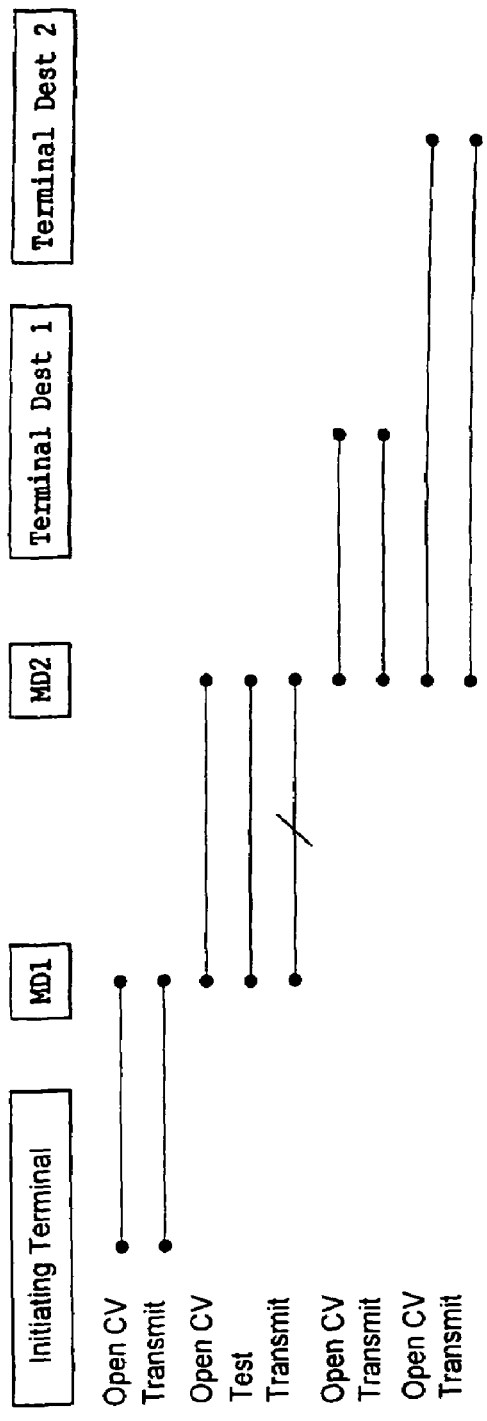
Fig. 2a
Fig. 2b

METHOD OF TRANSMITTING DATA, A BROADCAST MODULE, AND A TERMINAL FOR IMPLEMENTING THE METHOD

The present invention relates to a method of transmitting data. The invention is more particularly intended for use in X.25 networks.

X.25 networks include terminals which are:
either internal to the switches,
or external and connected by lines to circuits of a switch.

X.25 switches essentially include a packet handler (PH) circuit. The PH circuit is connected directly to the network and is capable of setting up a temporary link between two terminals, transporting information packets between the two terminals, and in particular applying flow control, and clearing down the link at the end of the call. An X.25 service can in this way be opened up to terminals internal or external to the switches.

To set up the temporary link, a call request packet sent by the calling switch or terminal contains the address of the called switch or terminal, which enables the call request packet to be routed to the destination called switch or terminal. The call request packet further contains a logical channel indication to identify a circuit in the calling switch or terminal which the called switch or terminal can use to transmit an indication of acceptance of the call request. The acceptance indication itself includes an indication of a logical channel to be used with the called switch or terminal for a subsequent transfer of data. The link can be cleared down by a call release packet or at the end of a time-delay. Data is exchanged in packet mode on the two logical channels constituting a bidirectional link during the call and when setting up the link.

For transmission, internal terminals access the PH circuit via an interface module which uses a library of functions. The library functions enable the terminals to manage setting up the link, transferring the data and clearing down the link. The interface module also provides a function for assembling blocks of information exchanged between the terminals into X.25 packets and for disassembling X.25 packets.

A terminal requests the interface module to set up an X.25 virtual circuit (VC) to a destination terminal designated by its address. The interface module translates the request into an X.25 call request packet which is sent to the PH circuit of the calling switch. The X.25 call request packet is routed to the PH circuit of the remote switch hosting the destination terminal. The called address indicated by the call request packet is analyzed in the called switch to determine whether the destination is an internal terminal. Where necessary, the call request packet is delivered to the interface module of the destination switch, which sends an event to the destination internal terminal to advise it of an incoming call request.

The response sent to the interface module from the destination internal terminal accepting the call request is converted into an X.25 call acceptance packet which travels back along the same path as the call request packet. The initiating calling source terminal is advised by an event of the actual setting up of the link. The link between the interface module of the calling switch and the terminal is identified by a particular logical channel number. The source terminal then establishes a request to send a block of information to the interface module, stating the logical channel number. The block of information is fragmented by the interface module into X.25 data packets which are then delivered to the calling PH circuit. On receipt, the X.25 data packets are reassembled by the other interface module into a block of information that is then delivered to the destination terminal. The link is bidirectional.

In an X.25 network, the switches, also known as routers, can be configured differently according to geographical or temporal requirements. A switch at one network level can therefore be connected by transmission paths to some of the adjoining switches and not connected to other switches. Network maintenance for a network of this kind is naturally handled by internal terminals or processes in each switch. In some cases (for example when broadcasting routing tables, declaring the presence of users, or transmitting information concerning the configuration of a switch or a list of users connected to it), carrying out a process necessitates telling all the other switches of the network that the configuration of the switch concerned has changed and/or that the other switches must be modified accordingly. The corresponding information is routed by a communication terminal using the network and the X.25 protocol.

Information can also be transmitted to all the switches as the result of the intervention of an operator (a physical person) at an external service terminal connected to a switch. The data to be transmitted produced by the internal terminals concerns network management. In the case of an automatic process internal to the switch the transmission terminal is an internal terminal using the interface module and in the case of an external terminal the interface module is not normally used.

Because of the management mode employed, the terminals must send as many blocks of information as there are terminals to which information must be sent. In an X.25 network, it is therefore necessary to set up as many virtual circuits as there are terminals to which the information is sent, either successively or simultaneously, depending on the capabilities of the switch. If the information is common to all the switches, for example a general configuration in the case of an internal terminal, the block of information must be sent over the network as many times as there are destination terminals to be informed. This transmission mode is obviously of concern in that it occupies the network in a totally unnecessary manner.

Also, the process is of little benefit to the interface module and the initiating PH circuit, because they are required to devote too many resources to the transmission, and those resources cannot be used elsewhere for optimum management of the remainder of the network. Furthermore, the repetitive nature of the blocks of information to be transmitted to all the switches of the network is a particular penalty and results in a non-negligible proportion of the resources of the network being devoted to maintaining its own operation.

U.S. Pat. No. 5,519,704 describes a method of broadcasting a block of information from a first terminal to a set of destination second terminals, each second terminal being connected to a switch of a network, the method consisting of:
transmitting the block of data from the first terminal to a broadcast module in a first switch which is connected directly to said first terminal, and
then broadcasting said block of data from said broadcast module to switches adjacent said first switch and to destination second terminals which are connected directly to said first switch.

The method is described for connectionless oriented transmission networks and cannot be transposed directly to connection oriented networks like X.25 networks.

An object of the invention is to remedy the above problem by proposing a broadcasting method that can be used in an X.25 network.

The invention consists firstly in a method of transmitting data in which, to broadcast a block of information from a first terminal to a set of destination second terminals, each second terminal being connected to a switch of a network, the method consists of:

transmitting the block of information from the first terminal to a broadcast module in a first switch which is connected directly to said first terminal, broadcasting said block of information from said broadcast module to switches adjacent said first switch and to destination second terminals which are connected directly to said first switch, and receiving said block of information in the destination second terminals, characterized in that to transmit a block of information from the first terminal to the broadcast module, the method further consists of:

sending a call request packet from the first terminal to the broadcast module of the first switch to request the setting up of an X.25 virtual circuit between said first terminal and the broadcast module of the first switch, placing a broadcast request in one field of said call request packet, and placing the block of information to be broadcast in the data packets of the X.25 virtual circuit set up between said first terminal and the broadcast module in response to said call request packet.

The above method is used in switches which then preferably all include a broadcast module. A switch is referred to as "adjacent" another switch if a link can be set up between the two switches without using a third switch. A switch transmits to its adjacent switches all information blocks that it receives and which are to be broadcast to the terminals. The blocks of information to be broadcast can be recognized because they are addressed to the broadcast module of the call request switch. The address of the broadcast module constitutes an implicit broadcast request.

According to the invention, an internal or external terminal initiating broadcasting sets up a single virtual circuit with the broadcast module of the switch to which it is connected and transmits the block of information to be broadcast to it once only. Unlike the method used in prior art X.25 networks, the broadcast module of the switch then propagates the block of information to all the broadcast modules of the switches of the network which adjoin the switch. This results in propagation to all the switches. On the downstream side, each network switch receiving the block of information can deliver it to the terminals which are connected to it.

This broadcast technique, which is known as "flooding", can be improved by sending a block of information to be broadcast from one switch to another only if that other switch has not already received it from elsewhere. Knowing the terminal or the switch which sent it the information to be broadcast, because the logical channel over which the broadcast service was invoked is clearly identified, a broadcast module does not send that transmitter terminal or switch the block of information to be broadcast that it has just received from it. Thus the block of information reaches each switch only once, and in particular does not travel around all the meshes of the network. This therefore reduces the overall bit rate.

A variant of the method is characterized in that, to transmit a block of information from the first terminal to the broadcast module, the method further consists of:

sending a call request packet from the first terminal to the broadcast module of the first switch to request the setting up of an X.25 virtual circuit between said first terminal and the broadcast module of the first switch, placing a broadcast request in one field of said call request packet, and placing the block of information to be broadcast in the user data field of said call request packet.

The invention also provides a broadcast module for a network including network switches and terminals connected to said switches, said switches and said terminals being adapted to set up X.25 links between them to transmit data, said switches including broadcast modules which receive blocks of information to be broadcast to all the terminals of a set of terminals, and whose function is to transmit said blocks of information to all the switches which are adjacent then in the network, and to all the terminals which are respectively connected directly to them, characterized in that it includes:

means for receiving a call request packet sent by a first terminal to said broadcast module, recognizing a broadcast request in one field of said call request packet, and then setting up an X.25 virtual circuit between said first terminal and the broadcast module, and means for storing and then broadcasting a block of information to be broadcast that has been placed in the data packets of the X.25 virtual circuit set up between said first terminal and the broadcast module.

A variant broadcast module is characterized in that it includes:

means for receiving a call request packet sent by a first terminal to said broadcast module, recognizing a broadcast request in one field of said call request packet, and means for setting up an X.25 virtual circuit between said first terminal and the broadcast module, and means for storing and then broadcasting a block of information to be broadcast that has been placed in the user data field of said call request packet.

The invention also provides a terminal for a network including network switches and terminals connected to said switches, said switches and said terminals being adapted to set up X.25 links between them to transmit data, said switches including broadcast modules which receive data to be broadcast to all the terminals of a set of terminals, and whose function is to transmit said data to all the switches which are adjacent then in the network, characterized in that it includes means for:

sending a call request packet from said first terminal to the broadcast module of a first switch to request the setting up of an X.25 virtual circuit between said first terminal and the broadcast module of the first switch, placing a broadcast request in one field of said call request packet, and placing the block of information to be broadcast in the data packets of the X.25 virtual circuit set up between said first terminal and the broadcast module.

A variant terminal is characterized in that it includes means for:

sending a call request packet from said first terminal to the broadcast module of a first switch to request the setting up of an X.25 virtual circuit between said first terminal and the broadcast module of the first switch, placing a broadcast request in one field of said call request packet, and placing the block of information to be broadcast in the user data field of said call request packet.

Figure 3:
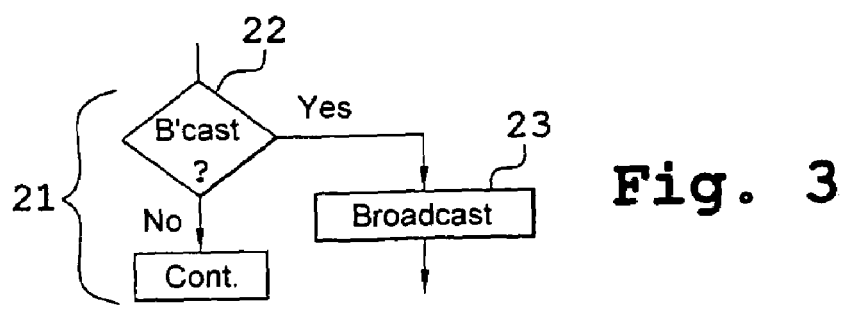

The invention will be better understood after reading the following description and examining the accompanying drawings. The drawings are provided entirely by way of illustrative and non-limiting example of the invention. In the figures:

FIG. 1 is a diagrammatic representation of an X.25 network that can be used to implement the method of the invention;

FIGS. 2a and 2b respectively show a method of transmitting blocks of information used by prior art terminals and the method of the invention; and FIG. 3 is a diagrammatic representation of a program used in each switch of the network.

FIG. 1 shows a network 1 which can be used by X.25 terminals using the method in accordance with the invention. The network includes a set of switches 2 to 11. The switches are interconnected by links forming a meshed network, for example, in which several paths can be used to connect one switch to another. The circuits of the switches can start automatic processes referred to as internal terminals. An external service terminal 12 can additionally be provided in a particular switch 2 located in premises occupied by a network administrator, for example, who is a physical person responsible for operating the system, and connected to the switch 2 by a bus 13. Other terminals, for example of the same type as the terminal 12, can be connected to the other switches or can include a different type of equipment.

The switch 2 is shown as a single entity. In practice it includes switching circuits, packet assembly (formatting) circuits, memory circuits, synchronization circuits and other circuits for transmitting blocks of information received to other switches or to other terminals. A terminal internal to the switch 2 is used for maintenance of the network 1. To this end, one equipment unit of the switch 2 includes a program 14 in a program memory 15. The program 14 is capable of using an operating system 16 and in particular applications or terminals 17 for maintenance of the network 1. The function of the terminals 17 is to modify the configuration of the switch 2 or to transmit corresponding information to the other switches 3 to 11. To this end the switch 2 includes information packet handling (PH) circuits 18. It also includes an interface module 19 between an internal terminal, which is represented by a program 17 contained in the memory 15, and the circuit 18. This is known in the art. The external terminal 12 is normally connected to the circuit 18 via the bus 13.

FIG. 2a is a diagram showing the sending of a block of information to a multitude of internal or external terminals connected to the switches 2 to 11 of the network by a prior art method. The sending of each block of information includes a first step of setting up a virtual circuit between a calling terminal and a destination terminal. This is done by the interface circuit for the internal terminals or by the external terminals themselves. The block of information is sent subsequently during a second transmission step. These two steps can be repeated for each transmission between the initiating terminal and any destination terminal. The identical blocks of information in FIG. 2a cause congestion of the network because they are transmitted many times to the terminals to which they are addressed. The blocks of information represented are those transmitted over logical channels set up in the switches connected to the initiating terminal and to the destination terminals. FIG. 2a shows diagrammatically that, to connect two terminals, the link from one switch to another switch is used twice. As with the invention, the link can be of any type and can be supported by any network. In this example it nevertheless carries multiple traffic.

FIG. 2b shows diagrammatically the modification applied by the method of the invention. For a block of information to be broadcast, an initiating terminal 12, which is an external terminal in this example, requests the setting up of an X.25 virtual circuit by sending a call request packet to the broadcast module 20 of the switch 2 to which it is directly connected. Note that the virtual circuit connects it to the broadcast module 20 of the switch 2 to which the initiating terminal is connected, not to one of the destination terminals for the block of information to be broadcast.

The terminal 12 then transmits the block of information to be broadcast via the virtual circuit set up as a result of the request from the terminal 12 and in the form of a plurality of data packets conforming to the X.25 protocol if the block of information is too large to fit in a single data packet. A bit included in each packet by virtue of the X.25 protocol indicates either that there is a further packet or that the packet concerned is the last packet constituting the block of information. The virtual circuit is cleared down at the request of the initiating terminal 12 when it has finished transmitting the block of information to be broadcast or by a timer in the broadcast module 20.

In accordance with the X.25 protocol, the address of the broadcast module is placed in the call request packet. It is a generic address which also constitutes an implicit broadcast request. In this case, it means that information received subsequently via the circuit set up as a result of the request carried by the call request packet is information to be broadcast.

Alternatively, the broadcast request can consist explicitly of a binary word which is referred to as the broadcast code and is placed in any field of the call request packet.

In a variant of the method according to the invention which can be used for small blocks of information, a block of information to be broadcast is placed in the call request packet itself. There is no need to set up a virtual circuit in this case.

The module 20 includes a memory for storing a block of information to be broadcast. It follows that there is no immediate return exchange between the initiating and destination terminals. The broadcast module 20 then broadcasts the stored block of information. Accordingly, a broadcast module MD1 of an outgoing switch transmits a block of information to be broadcast to a broadcast module MD2 of an incoming switch directly adjacent it. The transmission between the two modules MD1 and MD2 uses an X.25 link with a virtual circuit set up between the two modules MD1 and MD2.

The module MD2 in turn stores the block of information to be broadcast. It then transmits the block of information to the destination terminals Dest1 and Dest2 which are connected to its switch. The broadcast module MD2 then transmits the block of information to the other switches adjacent it, other than the outgoing switch.

Thus the link between the switch of the broadcast module MD1 and that of the broadcast module MD2 is used only once, although the block of information is transmitted to two destinations, Dest1 and Dest2, which are connected to the switch of the module MD2. The operation of setting up the virtual circuit from the initiating terminal to the broadcast module MD1 is effected only once. On the other hand, each broadcast module MD2 which receives the block of information to be broadcast opens as many virtual circuits as there are terminals connected to its switch.

If the initiating terminal is internal to the switch, the processing of the bloc of information to be broadcast terminates with activation of the broadcast module, in place of the interface module, and the broadcast module transmits the information to be broadcast as described above, after the virtual circuit has been set up.

The broadcast module MD1 can insert a rank number R in each block of information to be broadcast. The broadcast module MD1 can further insert the identity of the initiating terminal if a plurality of internal or external terminals connected to the same switch could carry out the broadcast operations, like the terminal 12.

The initiating terminals can also insert in the block of information to be transmitted a category code C enabling selective broadcasting of blocks of information. Only the terminals corresponding to category C receive the block of information to be broadcast. The rank number R and the category code C can be placed in the call request packet.

FIG. 3 shows the working of the method according to the invention in detail. The program 14 (FIG. 1) includes a broadcast subroutine 21 which is shown diagrammatically in FIG. 3 and essentially includes a test 22 for verifying that the destination address is the address DIFF of the broadcast module of the outgoing switch. That address is preferably a generic address, and each broadcast module of a switch can be called by means of that address from any adjacent broadcast module or can call another module using that address. Subsequent transmission occurs normally if the address is different, for example an address ADR or another address indicating that the block of information must be routed to a particular terminal.

On the other hand, if the address of the call request packet corresponds to the address DIFF of the broadcast module, the subroutine 21 uses, in addition to the test 22, a macroinstruction 23 representing the broadcast module 20. A first function of the macroinstruction 23 is to cause a receiving switch (here the switch 2) to transmit a block of information to be broadcast, which it has just received from an upstream switch or an external service terminal, to all the adjacent switches on its downstream side. For example, the switch 2 transmits the block of information to be broadcast to the switch 3, the switch 5, the switch 7 and the switch 10.

In practice, the adjacent switches on its downstream side are physically connected to activated inputs of the switch 2 on its upstream side. The switch 2 knows that the switches 3, 5, 7 and 10 are its adjacent switches because it has acquired that information, and where applicable stored it in a memory 24 when the network was constituted. The memory 24 also contains a list of internal or external terminals which are connected to the switch and can then receive the information to be broadcast to them from their connection switch.

According to the invention, each switch therefore transmits the block of information to be broadcast to each adjacent switch, in this example from the switch 3 to the switch 4. Similarly, the switch 5 transmits the block of information to be broadcast to the switch 6. Note that the switch 4 could also have transmitted the same block of information to be broadcast to the switch 6. To prevent such repetition, before sending a block of information to an adjoining switch a switch such as the switch 4, for example, can preferably interrogate the adjoining switches, in this example the switch 6, to find out if the switch 6 has already received the block of information that it is preparing to transmit to it.

To this end, the switch 4 tells the switch 6 that it intends to transmit to it the block of information of rank R or whose identity is coded. It can do this using a call request packet including the generic address (DIFF) of a broadcast module and the rank R of the block of information to be broadcast. Because the switch 5 has already transmitted the block of information of rank R to the switch 6, the switch 6 can respond by advising the switch 4, preferably in a data packet, that it has already received the block of information of rank R. In this case the response data packet is a refusal packet and the block of information of rank R is not transmitted from the switch 4. Consultation beforehand is very fast, of course. It is similar to using a signaling link and does not particularly occupy the link between the switch 4 and the switch 6.

The broadcast module also transmits the block of information to be broadcast to all the internal and external terminals connected directly to the switch of the broadcast module, i.e. connected to it without any other switch between them. This broadcasting is also effected for the outgoing switch vis-à-vis other terminals connected to the outgoing switch, of course.

There is no broadcast to the switch or the terminal which has just transmitted the block of information to be broadcast, because it used a logical channel for the transmission that enables the transmitting unit to be identified, so that what it has just sent is not sent back to it.

If necessary, the call request packet, or an area in the block of information to be transmitted, designates the terminals or the categories of terminals to receive the block of information to be broadcast. To this end, the call request packet used for the test 22 can include the category information C that the broadcast module of the receiving adjacent switch detects. The category information is preferably the category of the initiating terminal itself. The broadcast module then transmits the block of information to be broadcast to the terminals which are connected to it if the category C corresponds to them.

Alternatively, the category can be the address of a terminal. Accordingly, only the destination terminal receives the block of information allegedly to be broadcast. In this way a block of information can be sent via the broadcast module to a single terminal.

What is claimed is:

1. A method of transmitting data in which, to broadcast a block of information from a first terminal to a set of destination second terminals, each of which second terminals is connected to a switch of a network, comprises:
   transmitting the block of information from the first terminal to a broadcast module in a first switch which is connected directly to said first terminal,
   broadcasting said block of information from said broadcast module to switches adjacent said first switch and to destination second terminals which are connected directly to said first switch, and
   receiving said block of information in the destination second terminals,
   wherein, to transmit a block of information from the first terminal to the broadcast module, the method further comprises:
   sending a call request packet from the first terminal to the broadcast module of the first switch to request the setting up of an X.25 virtual circuit between said first terminal and the broadcast module of the first switch, placing a broadcast request in one field of said call request packet, and placing the block of information to be broadcast in the data packets of the X.25 virtual circuit set up between said first terminal and the broadcast module in response to said call request packet.

2. A method of transmitting data in which, to broadcast a block of information from a first terminal to a set of destination second terminals, each of which second terminals is connected to a switch of a network, comprising:

transmitting the block of information from the first terminal to a broadcast module in a first switch which is connected directly to said first terminal, broadcasting said block of information from said broadcast module to switches adjacent said first switch and to destination second terminals which are connected directly to said first switch, and receiving said block of information in the destination second terminals, wherein, to transmit a block of information from the first terminal to the broadcast module, the method further comprises:

sending a call request packet from the first terminal to the broadcast module of the first switch to request the setting up of an X.25 virtual circuit between said first terminal and the broadcast module of the first switch, placing a broadcast request in one field of said call request packet, and placing the block of information to be broadcast in a user data field of said call request packet.

3. A method according to claim 1 further comprising setting up an X.25 link between the broadcast module of the first switch and each of the broadcast modules of the adjacent switches.

4. A method according to claim 1, wherein the broadcast module of each switch tests whether an adjacent switch has already received a block of information to be broadcast before sending the block to it.

5. A method according to claim 1, comprising broadcasting a block of information to a second terminal connected to a switch adjacent the first switch if and only if said second terminal belongs to an expected category.

6. A method according claim 1, comprising broadcasting a block of information to a second terminal connected directly to the first switch if and only if said second terminal belongs to an expected category.

7. A method according to claim 5 wherein the expected category is that to which the first terminal belongs.

8. A method according to claim 5 further comprising sending from the first terminal to the switch to which it is connected a message indicating the category to which said first terminal belongs.

9. A method according claim 1, wherein at least one of the terminals is external relative to the switches.

10. A broadcast module for a network including network switches and terminals connected to said switches, said switches and said terminals being adapted to set up X.25 links between them to transmit data and said switches including broadcast modules which receive blocks of information to be broadcast to all the terminals of a set of terminals and whose function is to transmit said blocks of information to all the switches which are adjacent them in the network and to all the terminals which are respectively connected directly to them, comprising:

means for receiving a call request packet sent by a first terminal to said broadcast module, recognizing a broadcast request in one field of said call request packet, and then setting up an X.25 virtual circuit between said first terminal and the broadcast module, and means for storing and then broadcasting a block of information to be broadcast that has been placed in the data packets of the X.25 virtual circuit set up between said first terminal and the broadcast module.

11. A broadcast module for a network comprising network switches and terminals connected to said switches, said switches and said terminals being adapted to set up X.25 links between them to transmit data and said switches including broadcast modules which receive blocks of information to be broadcast to all the terminals of a set of terminals and whose function is to transmit said blocks of information to all the switches which are adjacent them in the network and to all the terminals which are respectively connected directly to them, comprising:

means for receiving a call request packet sent by a first terminal to said broadcast module, recognizing a broadcast request in one field of said call request packet, and means for storing and then broadcasting a block of information to be broadcast that has been placed in a user data field of said call request packet.

12. A broadcast module according to claim 10 or claim 11 further comprising means for determining whether a switch adjacent the switch to which it belongs has already received said block of information to be broadcast.

13. A terminal for a network comprising network switches and terminals connected to said switches, said switches and said terminals being adapted to set up X.25 links between them to transmit data and said switches comprising broadcast modules which receive data to be broadcast to all the terminals of a set of terminals and whose function is to transmit said data to all the switches which are adjacent them in the network, comprising:

sending a call request packet from said first terminal to the broadcast module of a first switch to request the setting up of an X.25 virtual circuit between said first terminal and the broadcast module of the first switch, placing a broadcast request in one field of said call request packet, and placing the block of information to be broadcast in the data packets of the X.25 virtual circuit set up between said first terminal and the broadcast module.

14. A terminal for a network comprising network switches and terminals connected to said switches, said switches and said terminals being adapted to set up X.25 links between them to transmit data and said switches comprising broadcast modules which receive data to be broadcast to all the terminals of a set of terminals and whose function is to transmit said data to all the switches which are adjacent them in the network, comprising:

sending a call request packet from said first terminal to the broadcast module of a first switch to request the setting up of an X.25 virtual circuit between said first terminal and the broadcast module of the first switch, placing a broadcast request in one field of said call request packet, and placing the block of information to be broadcast in a user data field of said call request packet.

15. A method according to claim 2, further comprising setting up an X.25 link between the broadcast module of the first switch and each of the broadcast modules of the adjacent switches.

16. A method according to claim 2, wherein the broadcast module of each switch tests whether an adjacent switch has already received a block of information to be broadcast before sending the block to it.

17. A method according to claim 3, wherein the broadcast module of each switch tests whether an adjacent switch has already received a block of information to be broadcast before sending the block to it.

18. A method according to claim 2, comprising broadcasting a block of information to a second terminal connected to a switch adjacent the first switch if and only if said second terminal belongs to an expected category.

19. A method according to claim 3, comprising broadcasting a block of information to a second terminal connected to a switch adjacent the first switch if and only if said second terminal belongs to an expected category.

20. A method according to claim 4, comprising broadcasting a block of information to a second terminal connected to a switch adjacent the first switch if and only if said second terminal belongs to an expected category.

21. A method according claim 2, comprising broadcasting a block of information to a second terminal connected directly to the first switch if and only if said second terminal belongs to an expected category.

22. A method according claim 3, comprising broadcasting a block of information to a second terminal connected directly to the first switch if and only if said second terminal belongs to an expected category.

23. A method according claim 4, comprising broadcasting a block of information to a second terminal connected directly to the first switch if and only if said second terminal belongs to an expected category.

24. A method according to claim 6, wherein the expected category is that to which the first terminal belongs.

25. A method according to claim 6, further comprising sending from the first terminal to the switch to which it is connected a message indicating the category to which said first terminal belongs.

26. A method according claim 2, wherein at least one of the terminals is external relative to the switches.

27. A method according claim 3, wherein at least one of the terminals is external relative to the switches.

28. A method according claim 4, wherein at least one of the terminals is external relative to the switches.

29. A method according claim 5, wherein at least one of the terminals is external relative to the switches.

30. A method according claim 6, wherein at least one of the terminals is external relative to the switches.

31. A method according claim 7, wherein at least one of the terminals is external relative to the switches.

32. A method according claim 8, wherein at least one of the terminals is external relative to the switches.

33. A method of transmitting data in which, to broadcast a block of information from a first terminal to a set of destination second terminals, each of which second terminals is connected to a switch of a network, comprises:

transmitting the block of information from the first terminal only to a broadcast module in a first switch which is connected directly to said first terminal, broadcasting said block of information from said broadcast module only to switches adjacent said first switch and only to destination second terminals which are connected directly to said first switch, and receiving said block of information in the destination second terminals, wherein, to transmit a block of information from the first terminal to the broadcast module, the method further comprises:

sending a call request packet from the first terminal to the broadcast module of the first switch to request the setting up of an X.25 virtual circuit between said first terminal and the broadcast module of the first switch, placing a broadcast request in one field of said call request packet, and placing the block of information to be broadcast in the data packets of the X.25 virtual circuit set up between said first terminal and the broadcast module in response to said call request packet.

34. A method of transmitting data according to claim 1, wherein said broadcast module inserts a rank number in the block of information to be broadcast.

35. A method of transmitting data according to claim 1, wherein a category code is inserted in the block of information wherein said category code enables selective broadcasting of blocks of information.

* * * * *